United States Patent Office 3,229,508
Patented Jan. 18, 1966

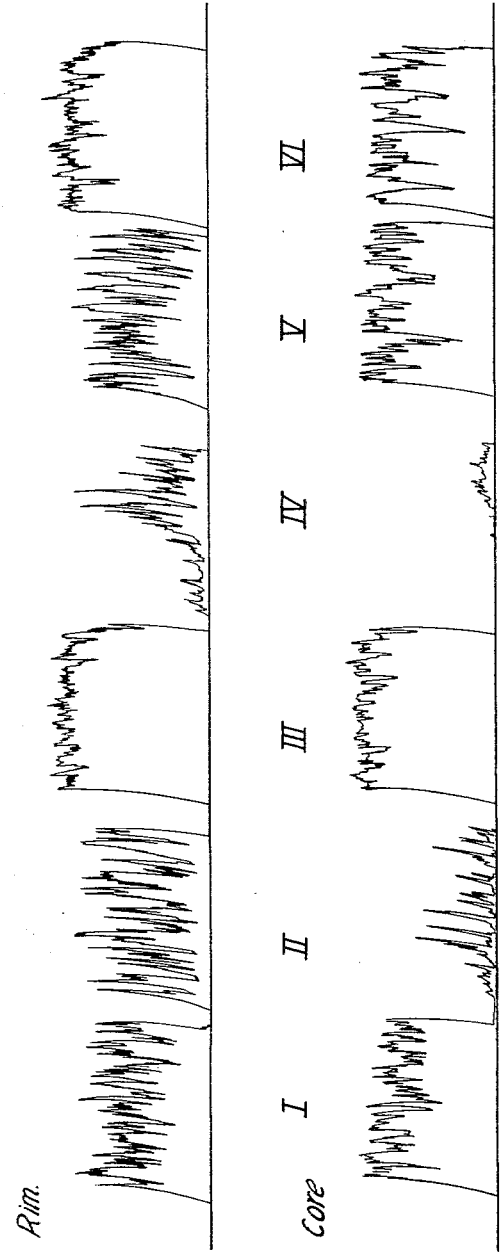

3,229,508
ULTRASONIC METHODS OF TESTING
Roy Samuel Sharpe, Abingdon, and Sydney Aveyard, Reading, England, assignors to United Kingdom Atomic Energy Authority, London, England
Filed Oct. 16, 1961, Ser. No. 145,241
Claims priority, application Great Britain, Oct. 25, 1960, 36,664/60
2 Claims. (Cl. 73—67.5)

This invention relates to ultrasonic methods of testing the grain refinement of metal bars.

The invention has one application in measuring the grain size of uranium bars for use in nuclear reactor fuel elements. The production process for these bars involves a beta quench treatment which produces a non-uniform grain refinement, the outer annular region of the bar having a smaller grain size than the core region. For production control purposes, a knowledge of the grain refinement in both these regions is required. The grain refinement in the core region can be tested in a known manner by directing a pulsed ultrasonic beam along a diameter of the bar and measuring the attenuation relative to a standard, the larger the grain size the greater being the attenuation. It is an object of the present invention to test the grain refinement in the annular region.

According to the present invention an ultrasonic method of testing the grain refinement in the outer annular region of a metal bar comprises directing a pulsed ultrasonic beam through the bar, the transmitter and receiver being mounted adjacent either side of the bar on a chord displaced from the bar diameter, the bar, transmitter and receiver being immersed in a suitable liquid, selecting the received pulses corresponding to that part of the incident pulse energy which is propagated through the annular region of the bar and reflected from the surface of the smaller arc subtended by the chord, and measuring the attenuation of said pulses. The metal may be uranium.

To enable the nature of the present invention to be more readily understood, attention is directed by way of example to the accompanying drawing wherein FIG. 1 is a schematic circuit diagram of apparatus for carrying out the present method.

FIG. 4 shows recorder chart traces obtained with the present method.

In one example of the present method a solid round uranium bar 2.92 cm. in diameter and 100 cm. long is immersed in water and rotated on rollers driven at approximately 100 r.p.m . Two 6 mc./s. piezoelectric transducers 1 cm. in diameter are located as transmitter and receiver adjacent either side of the bar in jig which can be traversed automatically from one end of the bar to the other in approximately 1 minute. The resulting scan is a helix of such a pitch that the whole of the bar is adequately inspected. The jig is adjustable in a direction at right angles to the bar axis so that the line joining the transmitter and receiver intersects the bar as a chord of variable position. Ultrasonic puless of about $1\mu$ sec. duration and 6 mc./s. frequency are fed to the transmitter. The output from the receiver is displayed on an oscilloscope, and a gate circuit controlled by a variable delay circuit enables the amplitude of a selected portion (in time) of the received signal to be recorded on a chart recorder as the transducers traverse along the bar.

Figure 1:
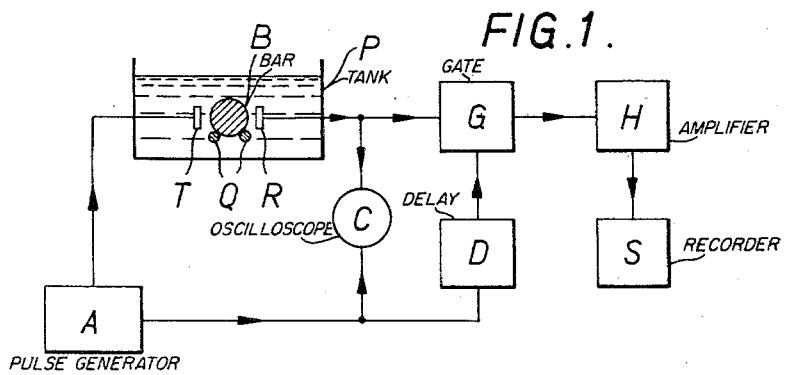

A block schematic diagram of the apparatus is shown in FIG. 1, in which the bar B (shown in cross-section) lying on rotatable rollers Q is immersed in water in a tank P, the transmitting and receiving transducers T and R being located on either side of the bar. The pulse-generator A provides supersonic pulses for the transducer T, and simultaneously provides trigger pulses for the time-base of the oscilloscope C, and for the variable delay circuit D which controls the gate G. The output pulses from the gate are amplified in the D.C. amplifier H, whose output is fed to the fast-response recorder S.

Brushes were attached to the transducer rig to remove air bubbles from the surface of the bar, and the transducer faces were cleared of bubbles before each traverse of a bar.

Figure 2:
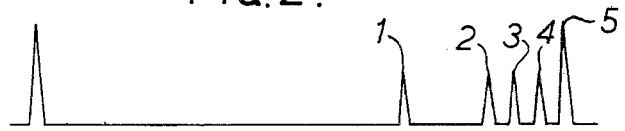
FIG. 2 represents an oscilloscope trace with numbered pulses thereon.
Figure 3:
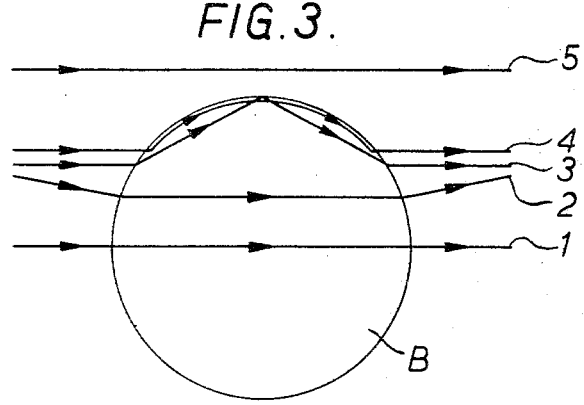
FIG. 3 is a diagrammatic cross-section of a uranium bar showing ultrasonic propagation paths numbered to correspond with the pulses in FIG. 2.

With the transducers in a diametral position relative to the bar, the relatively large-grained core thereof, occupying ½–⅔ of the bar diameter and having high specific attenuation, is the major factor in determining the attenuation. The oscilloscope trace displays the pulse 1 in FIG. 2, corresponding to path 1 in FIG. 3.

As the transducers are displaced from the diametral position, the angle of incidence of the beam onto the surface increases owing to the curvature of the bar B. The energy of the pulse now splits into a number of distinct pulses from whose separation on the oscilloscope trace the different modes of propagation, having different path lengths, can be distinguished. In the diametral position pulse 1 (FIG. 2) is the only one on the trace. As the transducers are displaced progressively from this position, pulse 1 disappears and pulse 2 appears. With further movement pulse 2 is reduced in amplitude and pulses 3 and 4 appear together. Finally, when the beam is clear of the bar, only pulse 5 appears. As will be seen from FIG. 3, pulse 2 corresponds to energy propagated directly along a chord; pulse 3 to energy internally reflected from the surface of the bar over the middle portion of the smaller arc subtended by a chord intersecting the transducers; pulse 4 to energy which travels as a surface wave round the bar; and pulse 5 to direct transmission through the water.

It is the amplitude of pulse 3, which travels through the outer annular region of the bar, which is measured in the present method. (That pulse 3 does correspond to this path has been shown experimentally by drilling a hole in a bar close to the surface parallel to its axis and rotating the bar. The amplitude of pulse 3 then passes through a minimum when the hole is in the middle region of the smaller arc.) The position of the transducers is adjusted until pulse 2 is a minimum and the delay and gate width then adjusted to select pulse 3 and exclude pulse 4. The chart recorder now indicates how the grain refinement in the outer annular region of the bar varies along its length.

FIG. 4 shows pairs of recorder chart traces resulting from traversing six shorter lengths I–VI of uranium bar in which the degrees of refinement had been deliberately varied. The upper trace of each pair was produced by pulses travelling through the outer annular region of the bar (pulse 3 in FIGS. 2 and 3), and the lower trace by pulses travelling through the core of the bar (pulse 1 in FIGS. 2 and 3). The recorder response was proportional to the amplitude of the received signal in decibels, i.e. proportional to the logarithm of the signal amplitude. All six upper traces were made with the same input power and amplifier gain settings, and so are directly comparable in amplitude. All six lower traces were also made with the same settings; the latter settings differed from those for the upper traces so that the upper and lower sets of traces are not directly comparable in amplitude.

In FIG. 4 an increasing height of the trace above the zero line is a measure of decreasing gain size, and it can be seen that different degrees of refinement of both the rims (i.e. the outer annular regions of the bar) and the cores are readily apparent. Bars III and VI are specimens of good refinement, bars I and V specimens of medium refinement, and bars II and IV specimens of poor refinement.

The ability of the present method to distinguish between rim and core refinement is well illustrated by comparing bars II and V; they have similar (medium) degrees of rim refinement, but the core refinement of bar II is very poor. Bar IV is of interest as indicating a markedly varying degree of both rim and core refinement along the length of the bar.

The following table gives grain count readings (number of grains per unit length) for the six bars of FIG. 4. A count was taken at each end of the bars, each rim grain count being the sum of four counts at 90° intervals round the bar; the core grain count was a single count taken in the area of the core having the largest grains.

| Bar No. | Rim | Core | Refinement |
|---|---|---|---|
| I | 48<br>50 | 5<br>5 | Medium. |
| II | 44<br>42 | 1<br>1 | Poor. |
| III | 58<br>59 | 5<br>5 | Good. |
| IV | 14<br>76 | 1<br>7 | Poor. |
| V | 43<br>46 | 4<br>4 | Medium. |
| VI | 56<br>64 | 4<br>6 | Good. |

It will be seen that there is good agreement between the variations in attenuation shown by FIG. 4 and the variations in grain count given in the table. Hence, taking bars III or VI as standard "pass" bars (i.e. having the minimum acceptable degree of grain refinement), the remaining bars could be "rejected" on the evidence of the recorded traces as not having the required degree of refinement.

It is found that the pulse resolution is improved by fitting rubber masks with rectangular cut-out windows in the faces of the transducers, the longer sides of the windows being parallel to the bar axis.

The testing of the annular region and of the core region can be done simultaneously by using a second pair of transducers arranged in the diametral position. Alternatively a single pair of large-area transducers so masked as to produce two ultrasonic beams can be used, one beam in the diametral position for the core region and the other displaced therefrom for the annular measurement.

It will be apparent that the method can be applied to thick-walled tubular bars as well as to solid bars.

We claim:

1. A method of testing the grain refinement in the outer anngular region of a metal bar of circular cross-section comprising directing a pulsed ultrasonic beam through the bar, the transmitter and receiver being mounted adjacent either side of the bar on a chord displaced from the bar diameter and being so oriented that, in the absence of said bar, the beam would be transmitted directly therebetween, the bar, transmitter and receiver being totally immersed in a suitable liquid, selecting the received pulses corresponding to that part of the incident pulse energy which is propagated through the outer annular region of the bar and reflected from the midpoint of the surface of the smaller arc subtended by the chord said incident pulse energy being such that said received pulses are of measurable amplitude, and measuring the attenuation of said received pulses.

2. A method of testing the grain refinement in the outer annular region of a uranium bar of circular cross-section comprising directing a pulsed ultrasonic beam through the bar, the transmitter and receiver being mounted adjacent either side of the bar on a chord displaced from the bar diameter and being so oriented that, in the absence of said bar, the beam would be transmitted directly therebetween, the bar, transmitter and receiver being totally immersed in a suitable liquid, selecting the received pulses corresponding to that part of the incident pulse energy which is propagated through the outer annular region of the uranium bar and reflected from the midpoint of the surface of the smaller arc subtended by the chord said incident pulse energy being such that said received pulses are of measurable amplitude, and measuring the attenuation of said received pulses.

References Cited by the Examiner
UNITED STATES PATENTS

| 2,795,133 | 6/1957 | Ots | 73—67.7 |
| 2,848,891 | 8/1958 | Hunter et al. | 73—67.5 |
| 2,946,217 | 7/1960 | Fruengel | 73—67.5 |
| 2,949,769 | 8/1960 | Heller | 73—67.6 |

LEO SMILOW, *Primary Examiner.*

ROBERT EVANS, RICHARD C. QUEISSER, J. G. MURRAY, J. W. HARTARY, *Assistant Examiners.*